(12) United States Patent
Brennan (10) Patent No.: US 7,530,627 B2
(45) Date of Patent: May 12, 2009

(54) PRODUCE TRAILER CAGE

(75) Inventor: Daniel Eugene Brennan, Great Falls, MT (US)

(73) Assignee: Tramsport Leasing Company LLP, Great Falls, MT (US)

( * ) Notice: Subject to any disclaimer, the term of this patent is extended or adjusted under 35 U.S.C. 154(b) by 365 days.

(21) Appl. No.: 11/216,471

(22) Filed: Aug. 31, 2005

(65) Prior Publication Data

US 2007/0029838 A1 Feb. 8, 2007

Related U.S. Application Data

(60) Provisional application No. 60/705,129, filed on Aug. 3, 2005.

(51) Int. Cl.
*B62D 33/04* (2006.01)

(52) U.S. Cl. ............... 296/186.4; 296/182.1; 296/183.1
(58) Field of Classification Search ..................... 296/3, 296/24.31, 182.1, 183.1, 186.1, 186.4, 36, 296/43, 50, 56
See application file for complete search history.

(56) References Cited

U.S. PATENT DOCUMENTS 4,824,157 A * 4/1989 Nielsen et al. ......... 296/100.01
6,902,226 B1 * 6/2005 Taylor ..................... 296/182.1

* cited by examiner

*Primary Examiner*—Joseph D Pape
(74) *Attorney, Agent, or Firm*—Dorsey & Whitney LLP (57) ABSTRACT

A trailer and trailer cage for produce in which the front, rear and sides of the cage are flexibly connected to one another. The invention also relates to a mechanism for tensioning a side gate of the cage.

7 Claims, 11 Drawing Sheets

PRODUCE TRAILER CAGE

CROSS REFERENCE TO RELATED APPLICATION(S)

This application claims the benefit of Provisional Application Ser. No. 60/705,129 filed Aug. 3, 2005.

BACKGROUND OF THE INVENTION

1. Field of the Invention

The present invention relates to a produce trailer and trailer cage for receiving, transporting and dumping produce. The invention has particular applicability to sugar beets. During use, the trailer and trailer cage receives sugar beets from one location such as the harvest field and delivers them to a second location such as a processing facility.

2. Description of the Prior Art

Various trailer designs and systems currently exist for transporting produce such as sugar beets from a first location such as the harvest field and delivering the same to a second location such as a processing facility. One such trailer and trailer cage system includes a generally rigid trailer cage and a plurality of adjacent, top pivoting side gates along one side. To unload such trailer, the plurality of adjacent side gates are unlatched along their lower edge and the trailer is tipped toward the gate side. This causes the gates to swing open and the sugar beets or other produce to slide off the trailer and into a receiving hopper at a processing facility.

While such prior art trailer designs of this type are satisfactory in many respects, various limitations continue to exist. Because these prior art trailer and cage designs have multiple side gates and because the prior art cages are comprised of a substantially rigid structure, openings often existed between the gates themselves and between the bottom of the gates and the curved trailer bed. As a result, it was common for smaller sugar beets or other produce to fall through these openings. Thus, there is a continuing problem of keeping the entire harvested crop in the trailer.

Accordingly, there is a need in the art for a produce trailer and trailer cage design which overcomes these deficiencies, among others, in the prior art.

SUMMARY OF THE INVENTION

In general, the present invention relates to a produce trailer and trailer cage design for receiving a produce crop such as sugar beets from the harvest field, transporting the same to a processing facility and then dumping the produce at such facility. As an improvement over the prior art designs, openings between adjacent side gates and between the side gates and the trailer bed have been substantially eliminated or minimized, thereby limiting the loss of smaller produce such as sugar beets during transport from the field to the processing facility.

In the preferred embodiment, the trailer cage is comprised of front and back cage portions and a pair of side cage portions which are covered with a produce retaining mesh. These cage portions are flexibly interconnected at their corners and at joints along the side portions of the cage. This results in a cage structure which includes "floating" connections at the corners and at intermediate points along the side wall portions to provide a cage that is allowed to flex during use.

The preferred embodiment of the invention also includes a single side gate extending the entire length of the trailer and a plurality of gate latch mechanisms spaced along the trailer and the lower edge of the gage. These latch mechanisms are selectively and simultaneously actuated to release the bottom of the gate for dumping the contents of the trailer. The side gate is a rigid, unitary structure having a single, continuous top rail, a single, continuous bottom rail and a plurality of laterally spaced vertical posts connected to the top and bottom rails. In the preferred embodiment, the unitary gate is supported along the length of the trailer by a plurality of substantially stationary vertical support posts. One end of these posts is connected with and received by a connection member in the form of a support sleeve in the trailer bed. The opposite, upper end of such posts is connected with the top rail of the gate in a substantially flexible relationship which permits the top rail and thus the entire gate to pivot relative to the support posts, but which substantially precludes any relative lateral movement.

The cage of the present invention also includes a produce retaining mesh and a mesh tightening means for tightening the mesh of the unitary gate.

Accordingly, an object of the present invention is to provide a produce trailer and trailer cage design in which various components of the trailer cage are interconnected with flexible connections.

Another object of the present invention is to provide a produce trailer and trailer cage design having a unitary, pivotable side gate extending the entire length of the trailer.

These and other objects of the present invention will become apparent with reference to the drawings, the description of the preferred embodiment and the appended claims.

DESCRIPTION OF THE PREFERRED EMBODIMENT

Figure 1:
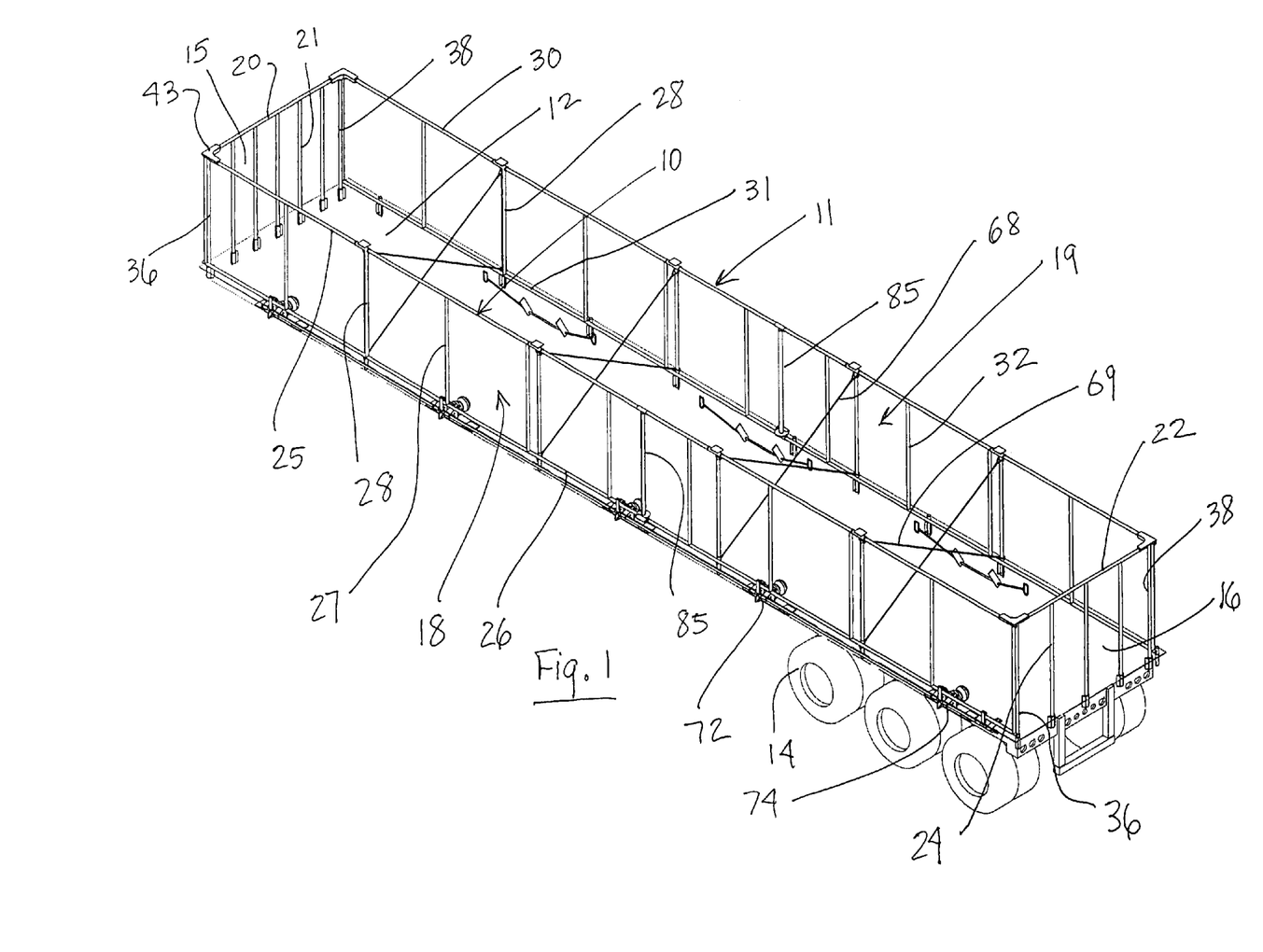
FIG. 1 is an isometric view of a portion of the trailer and trailer cage in accordance with the present invention.

Reference is initially made to FIGS. 1-4 showing various views of the trailer and trailer cage design of the present invention. The design includes a trailer 10 comprising a trailer bed 12 and a set of trailer wheels 14. The trailer cage 11 is connected with the bed 12 and includes front and rear cage portions 15,16 (FIG. 1) and a pair of side cage portions 18,19 (FIG. 1). In all but a few figures, the mesh has been left off so that the cage construction could be shown better.

The cage 11 includes four vertical corner posts positioned between adjacent cage portions. Two of these corner posts 36,36 define the cage corners adjacent to the cage side portion 18, while the other two corner posts 38,38 define the cage corners adjacent to the cage side portion 19. The front cage portion includes a top rail 20 and a plurality of vertical posts 21 rigidly connected to the top rail 20. Similarly, the rear cage portion includes a top rail 22 and a plurality of vertical posts 24 rigidly connected with the top rail 22. The bottom ends of the posts 21 and 24 are connected with the trailer bed 12 as described below. The side cage portions 18 and 19 are comprised of unitary gates. These gates extend the entire length of the trailer from the front end to the rear end. Each of these gates includes a means 85 for tensioning the mesh on the gates and is supported by a plurality of laterally spaced vertical posts 28.

Figure 4:
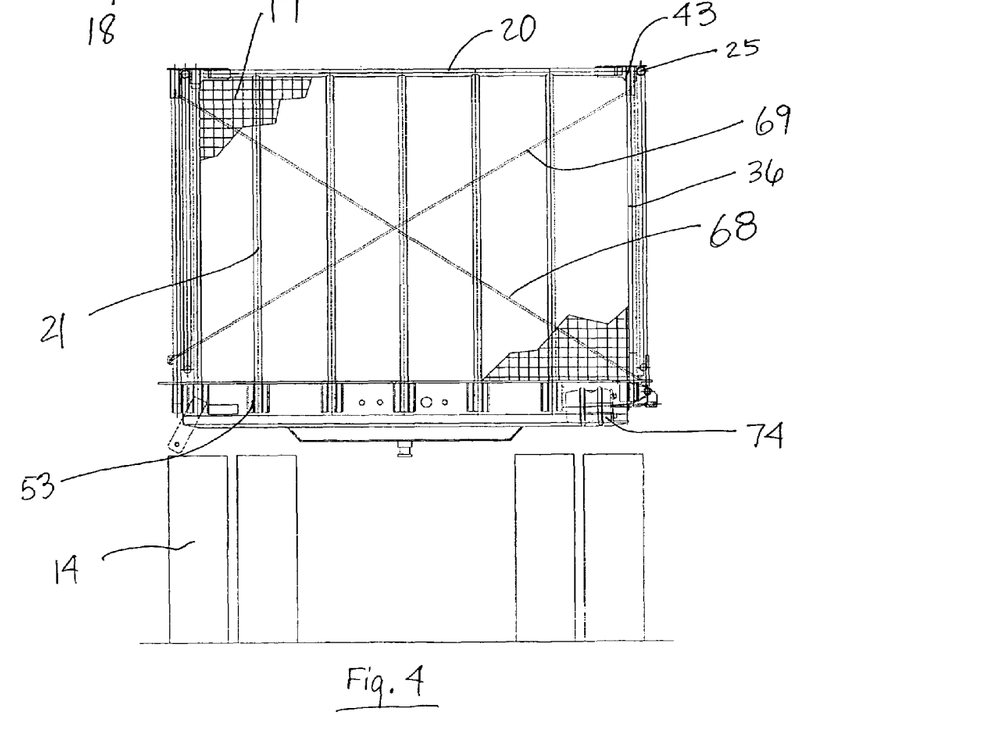
FIG. 4 is a elevational view of the front end of the trailer and trailer cage.
Figures 18, 19, 20:
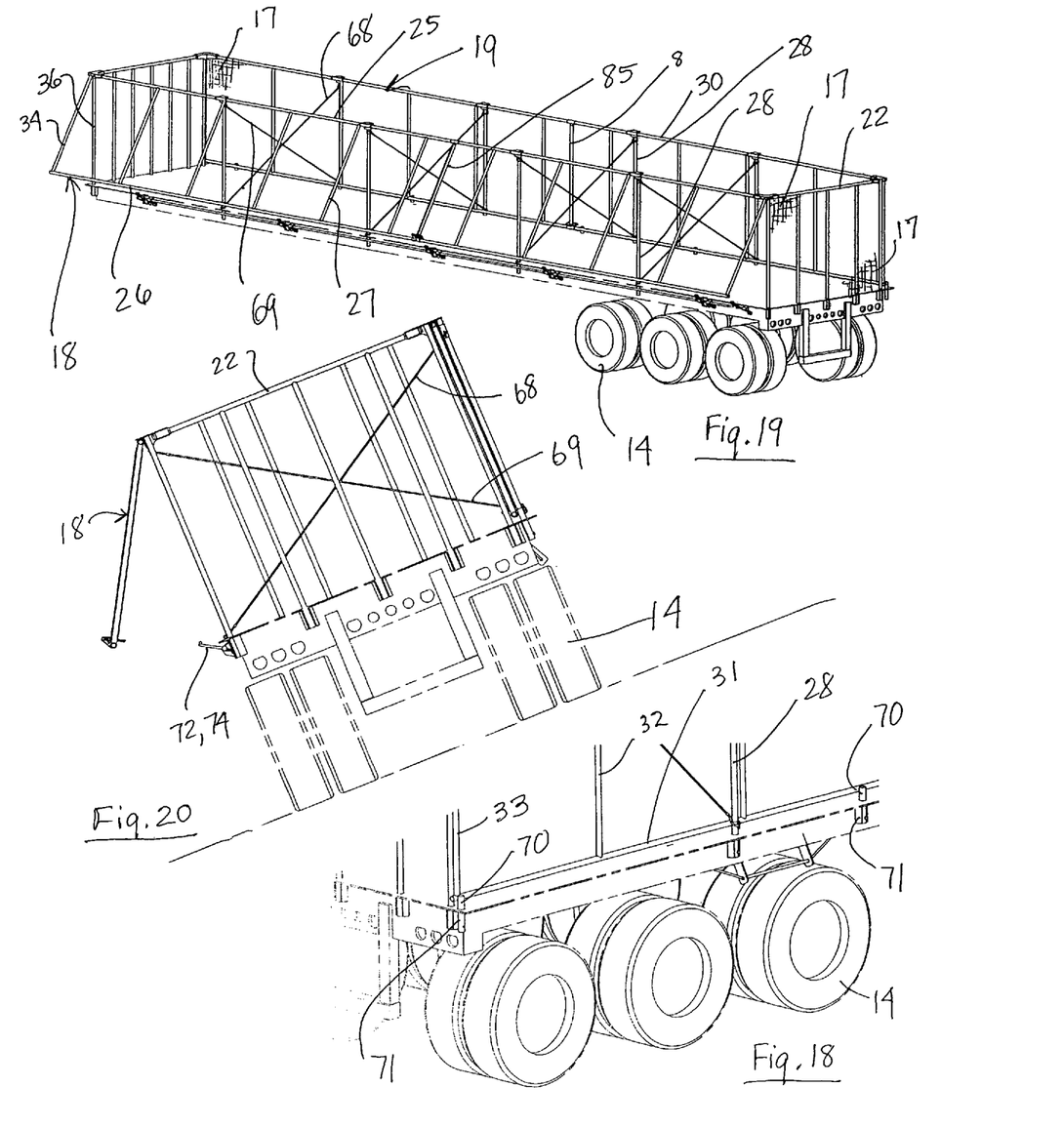
FIG. 18 is a fragmentary, isometric view showing the gate locking mechanism for the right side of the trailer cage.
FIG. 19 is an isometric view showing the unitary gate in its open position.
FIG. 20 is an elevational end view of the trailer with the gate open and the trailer tipped to permit unloading.

As shown in FIGS. 4 and 19, a mesh or mesh liner 17 is provided on the inner side of each of the front rear and edge portions 15, 16, 18 and 19. This mesh liner is connected with the edge rails and posts of each of the cage portions 15, 16, 18 and 19 either directly or via a rod threaded through the peripheral edge of the mesh, by a manner known in the art such as conventional ties. In the preferred embodiment, the mesh liner 17 is a polygrid beet fence with UV protection and a 2"×2" grid. A mesh tensioning means and ratchet tensioner 85 is provided for each cage portion.

The unitary gate associated with the cage side portion 18 is comprised of a top rail 25, a bottom rail 26, a pair of vertical end posts 34 and a plurality of vertical intermediate posts 27. The vertical posts 34 and 27 extend between and are rigidly connected with the top rail 25 with the bottom rail 26. The unitary gate associated with the side cage portion 19 includes a top rail 30, a bottom rail 31, a pair of vertical end posts 35 and a plurality of vertical intermediate posts 32. The vertical posts 35 and 32 extend between and are rigidly connected with the top rail 30 and the bottom rail 31.

Figure 14:
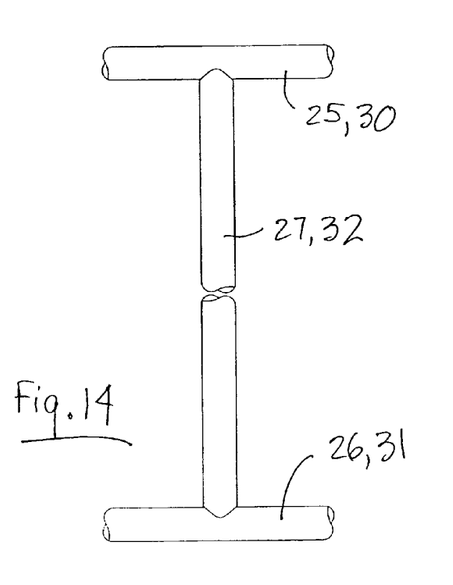
FIG. 14 is an elevational, fragmentary and broken apart view showing the connection between the top and bottom rails of a gate and the vertical posts of the gate.
Figure 15:
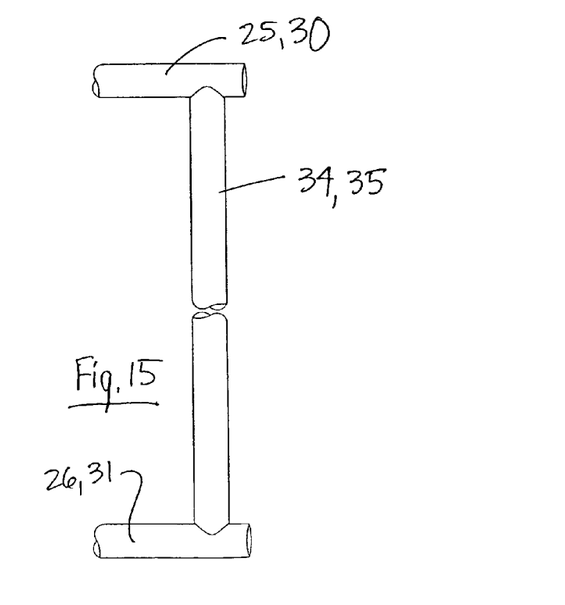
FIG. 15 is an elevational, fragmentary and broken apart view showing the connection between the top and bottom rails of a gate and the end posts.

As shown in FIGS. 14 and 15, the top rails 25 and 30 are connected with the bottom rails 26 and 31, respectively, via the vertical end posts 34 and 35 and via the vertical intermediate posts 28 and 32, respectively. These connections are rigid connections such as welding. With this structure, a unitary, substantially rigid side gate is provided on each side of the trailer. These gates extend the entire length of the trailer and, as will be discussed below, are pivotally supported at their top rails 25 and 30 relative to the support posts 28. In the preferred embodiment, the top rails 25,30, the bottom rails 26,31, the vertical intermediate posts 28,32 and the vertical end posts 34,35 are constructed of 4130 Chrome Molly tubing.

Figures 5, 6:
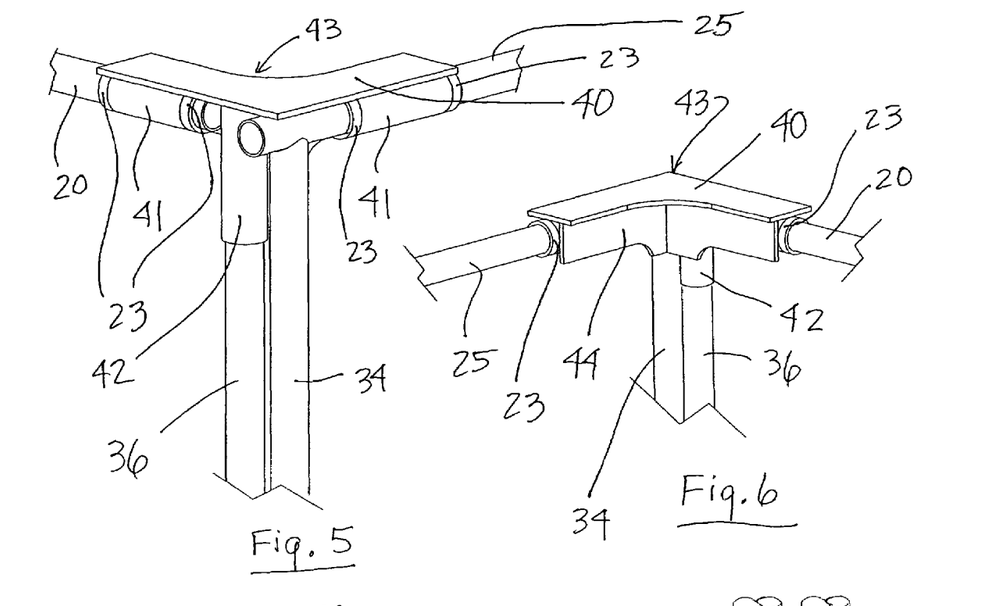
FIG. 5 is a fragmentary, enlarged isometric view of one of the corner connections.
FIG. 6 is a fragmentary, enlarged isometric view of the corner connection of FIG. 5 as viewed form the inside of the cage.

With reference to FIGS. 5 and 6, each of the upper or top corners of the cage, defined by the corner posts 36 and 38 includes a corner connection member 43. Such connection member 43 flexibly and non rigidly connects the respective top rails of adjacent front, rear and side cage portions to one another and to the vertical corner posts 36 and 38. This corner connection member 43 is substantially the same for each of the top cage corners. Accordingly, the details of the connection member 43 will be shown and described only with respect to the upper rear left corner of the cage as shown in FIGS. 5 and 6.

With continuing reference to FIGS. 5 and 6, the connection member 43 comprises the corner connection plate 40, the pair of sleeves 41,41, the vertical pipe section 42 and the inner stabilizing bracket 44 (FIG. 6). These components are preferably constructed of steel. As shown, the corner connection has a generally L-shaped configuration. The sleeves 41,41 are rigidly connected via welding or the like to the lower surfaces of the connection plate 40 so that the sleeves 41,41 are at right angles to one another. The sleeves 41 are generally cylindrical seamless pipe sleeves having an inner diameter slightly larger than the outer diameter of the top rails 25, 30, 20 and 22 with which they are associated. The vertical pipe section 42 is also a generally cylindrical seamless steel pipe member which is rigidly connected to the bottom surface of the connection plate 40 via welding or the like so that it is generally vertically oriented relative to the plate 40. The pipe section 42 has an inner diameter which is slightly greater than the outer diameter of the corner posts 36 and 38 to permit the posts 36 and 38 to be inserted into the posts 42.

As shown best in FIG. 6, the stabilizing bracket 44 is also a generally L-shaped bracket member having a top edge rigidly connected to the bottom surface of the connection plate 40. The outer surfaces of the stabilizing bracket 44 are also rigidly connected via welding or the like to portions of the sleeves 41,41 and to the pipe section 42.

As shown in FIG. 5, each of the top rails 25 and 22 (and the other top rails with which the connection member 43 is associated) are provided with a pair of spaced collars 23. Each pair of collars are welded to the exterior surface of the top rails 25 and 22 (for the corner shown in FIG. 5) in a position closely adjacent to the ends of the pipe sections 41,41. The collars 23 capture the sleeves 41,41 to substantially preclude lateral movement of the top rail 25 and the top rail 22 relative to their respective sleeve 41 and thus the connection member 43. The collars 23 on the top rail 22 are positioned near the end of the top rail 22, while the collars 23 on the top rail 25 are spaced inwardly from the end of the top rail 25 so that the vertical end post 34 is positioned outside of, or to the rear of, its respective sleeve 41. With this connection, rotational or pivotal movement of the top rails 25 and 22 is permitted relative to the sleeves 41,41, but lateral relative movement of the top rails 25 and 22 relative to the sleeves 41,41 is substantially precluded.

Figure 7:
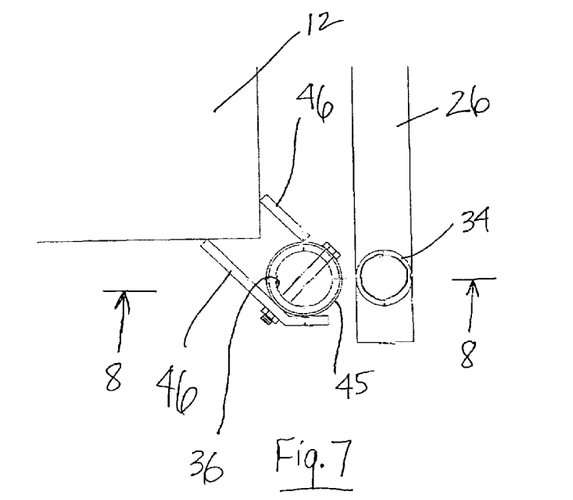
FIG. 7 is a plan view showing the corner pocket for receiving a corner post.
Figure 8:
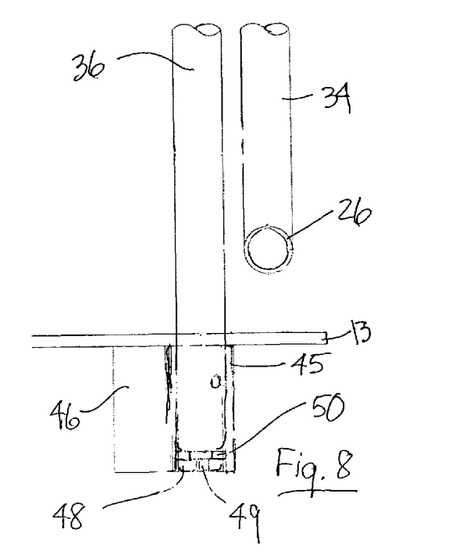
FIG. 8 is an elevational side view, partially in section, as viewed along the section line 8-8 of FIG. 7 and showing the corner post therein.

The lower ends of the corner posts 36 are connected with the trailer bed via a receiving pocket assembly shown best in FIGS. 7 and 8. Specifically, the corner pocket assembly includes a vertically extending cylindrical member in the form of the pipe section 45 and a pair of side support plates 46, 46. The pipe section 45 is rigidly connected to the trailer bed 12 and the extension 13 via the pair of support plates 46. One side or side edge of each of the support plates 46 is connected by welding to a side of the vertical pipe section 45 as shown best in FIG. 7 and an opposite side edge of the support plates 46 is rigidly connected to a portion of the trailer bed 12 via welding or the like. The top edges of the plates 46 may also be rigidly connected to a bottom surface of the bed extension 13, if desired, via welding or the like.

In the preferred embodiment, the vertical pipe 45 is constructed of aluminum and is provided with an aluminum plug 48 which is welded into the bottom end of the pipe 45. The plug 48 includes a center opening 49 to allow drainage of any water which may collect within the interior of the pipe 45. If desired, a steel washer 50 or the like can be positioned on top of the plug 48 to minimize wear between the vertical corner post 36 and the plug 48. A threaded member such as the bolt 51 extends through aligned openings in the vertical posts 36 to prevent the posts 36 from rising up relative to the pipe section 45 during use. The inner diameter of the pipe section 45 is similar to the inner diameter of the pipe section 42 (FIG. 5) which is slightly larger than the outer diameter of the corner post 36. This permits the corner posts 36 to be inserted into the pipe sections 45 of the pocket assemblies 47 and thus connect the lower ends of the posts 36 to the trailer bed. The posts 36 are supported relative to the pipe sections 45 via the plugs and washers 48,50 and the bolts 51.

Figure 3:
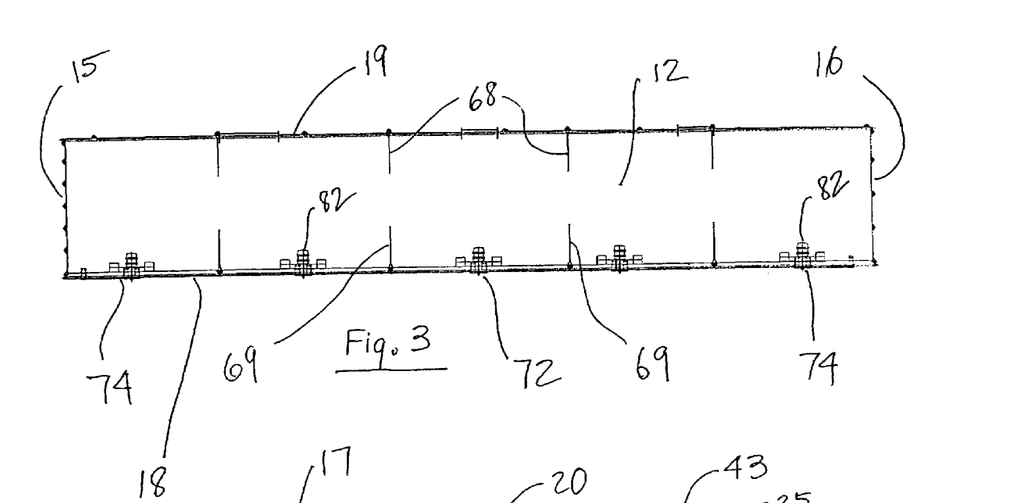
FIG. 3 is a plan view of the trailer cage.
Figure 12:
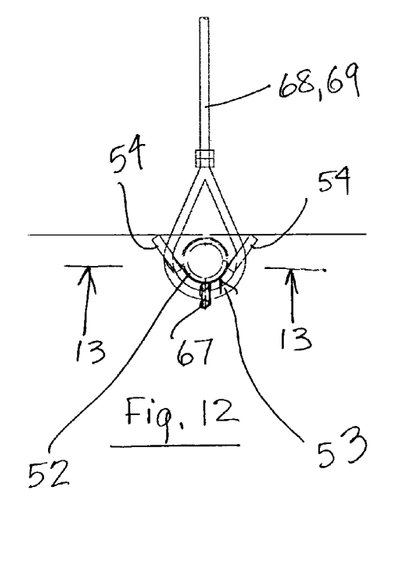
FIG. 12 is a plan view of the side pocket assembly for supporting the side posts.
Figure 13:
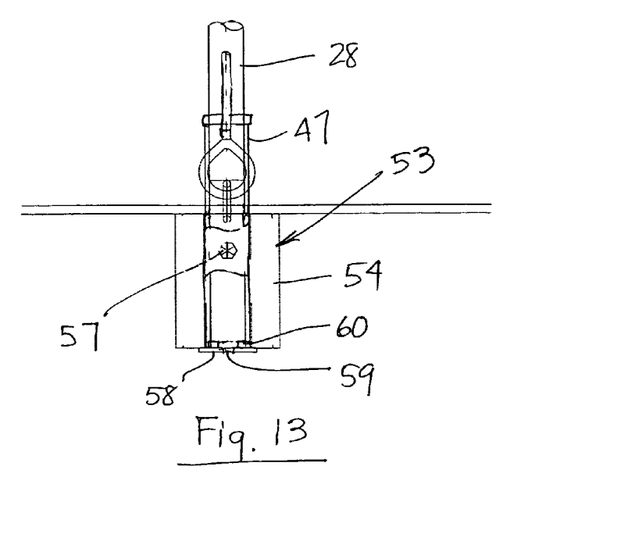
FIG. 13 is a view, partially in section, as viewed along the section line 13-13 of FIG. 12.

The opposite vertical corner posts 38 are connected to its adjacent top rails 30, 20 and 22 by a connection mechanism similar connection member 43 shown in FIGS. 5 and 6. The lower ends of these posts 38, however, are connected to the trailer bed 12 by the same pocket assembly as the pocket assembly for connecting the lower ends of the vertical front posts 21, the vertical rear posts 24 and the vertical intermediate side posts 27 and 28. Specifically, each of these vertical support posts is connected with the trailer bed via the connection mechanism illustrated best in FIGS. 11, 12 and 13. This connection mechanism comprises a pocket assembly 53 which comprises a vertical pipe section 52 and a pair of support plates 54,54. As shown, the pipe section 52 is positioned below the bed extension 13. One side edge of the support plates 54 is rigidly connected with side portions of the pipe 52 via welding or the like and the opposite side edge is rigidly connected via welding or the like to portions of the trailer bed 12 at the point 55. If desired, the upper edges of the plates 54,54 can be rigidly connected to the bottom surface of the bed extension 13 via welding or the like at the point 56. A pipe sleeve 47 is positioned above the section 52 and is vertically retained relative to the post 28 via the collar 37 welded to the post. Thus, the sleeve 47 is capable of limited rotational movement relative to the post 28. A coil or chain link 67 is welded to a portion of the sleeve 47 for connecting a bracing cable 68,69 (FIGS. 3, 4 and 11).

Similar to the pipe sections 45 for receiving the corner posts 36 (FIGS. 7 and 8), the pipe section 52 is constructed of aluminum and is provided with an aluminum plug 58 with a center drain hole 59. If desired, a steel washer or the like 60 can be positioned above the plug 58 to minimize wear between the posts 21, 24, 28 and 38 and the plug 58. The posts 21, 24, 28 and 38 are retained within the pipe sections 52 by a threaded member 57 (FIG. 13) extending through aligned openings in the posts and the pipe sections. A pocket assembly 53 of this type is provided to connect each of the vertical posts 21, 24, 28 and 38 to the trailer bed 12, although the sleeve 47 is only needed for the posts 28.

Figures 9, 10, 11:
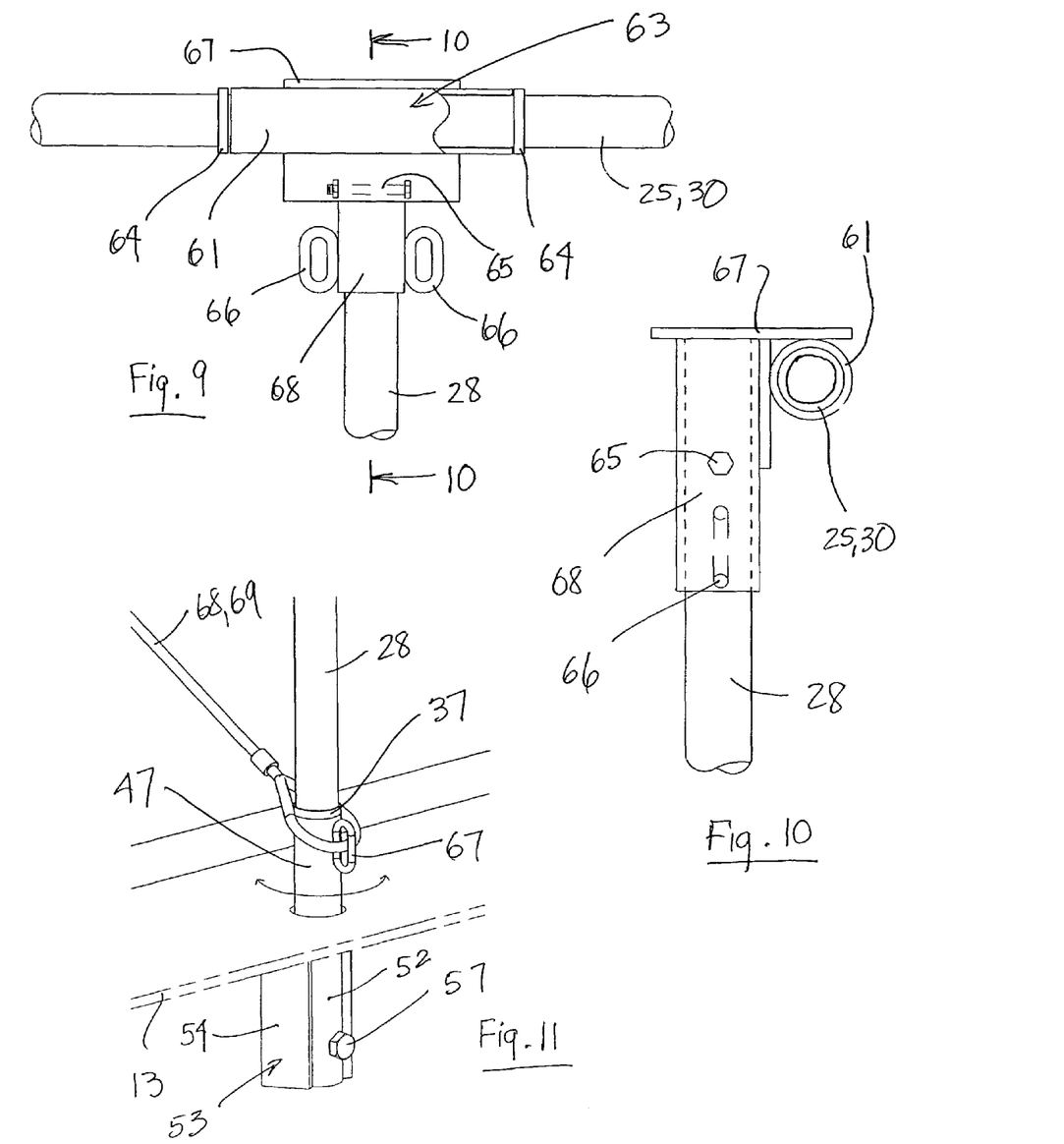
FIG. 9 is an elevational view showing the connection between the top rail of a side gate and one of the vertical support posts.
FIG. 10 is a view, partially in section, as viewed along the section line 10-10 of FIG. 9.
FIG. 11 is an isometric fragmentary view of the lower portion of a support post and its side pocket assembly.

Each of the top rails 25 and 30 of the gates forming the side cage portions 18 and 19 are vertically supported by, and pivotally connected with, the upper ends of each of the vertical support posts 28 via a support and connection mechanism shown best in FIGS. 9 and 10. Specifically, this connection mechanism comprises a connection member 63 which includes a generally laterally extending pipe section 61, a generally vertically extending pipe section 62 and a connection bracket 67. The pipe section 62 is rigidly connected with the pipe section 61 via the connection bracket 67 through welding or the like. When connected, the pipe section 62 extends at generally right angles from near the middle of the section 61. The sections 61 and 62 are constructed of aluminum and have inner dimensions slightly larger than the top rails 25,30 and the vertical support posts 28, respectively. This permits the continuous top rail 25,30 which extends the entire length of the trailer to extend through the pipe section 61 as shown. A pair of collars 64,64 are welded to the exterior surface of the top rails 25,30 at a position closely adjacent to the ends of the pipe section 61. These collars 64,64 capture the pipe section 61 and preclude lateral movement of the top rails 25,30 relative to the connection member 63. With this connection, pivotal or rotational movement of the top rails 25,30 is permitted relative to the pipe section 61, and thus the post 28, but lateral movement is prevented by the collars 64,64. The pipe section 62 is designed to fit over the top ends of the support posts 28 as shown. A bolt or other threaded member 65 extends through aligned openings in the pipe section 62 and the upper end of the post 28 to prevent relative vertical movement between the post 28 and the member 63.

A pair of coil or chain links 66 are rigidly connected to the sides of the pipe section 62 via welding or the like to enable a bracing cable (described below) to be connected with the member 63.

With the above-described trailer cage structure, a substantially flexible, rather than rigid, cage is provided. Specifically, the front cage portion defined by the top rail 20 and its rigidly connected vertical posts 21 is flexibly connected to the top rails 25 and 30 via the corner connection members 43 and to the trailer bed 12 via the connection members 53. Similarly, the rear cage portion comprised of the top rail 22 and its rigidly connected vertical posts 24 is flexibly connected with the top rails 25 and 30 via the connection members 43 and to the trailer bed 12 via the connection members 53. The top rails 25 and 31 of the side cage portions 18 and 19 are flexibly connected to the top front and top rear rails 20 and 22 via connection members 43 and to the vertical support posts 28 via the connection member 63. The posts 28, in turn, are flexibly connected with the trailer bed 12 via the pocket assembly 53.

As shown best in FIGS. 3 and 4, the side cage portions 18 and 19 are further supported via a plurality of bracing cables 68 and 69. These bracing cables 68 and 69 extend from the connection members 63 at the top of each of the support posts 28 to a portion of the connection members 53 on the opposite side of the trailer bed 12 near the lower end of the support posts 28. Thus, these bracing cables 68 and 69 are associated with each support post 28 and its corresponding support post 28 on the opposite side of the trailer. The bracing cables 68 and 69 are connected to the connection members 63, with assistance from the chain links 66, and to the connection members 53, with assistance from the chain link 67. These cables 68 and 69 assist in preventing the top rails 25,39, and thus the side gates, from rising up during use. They also keep the top rails 25 and 30 from bowing outwardly during use.

To summarize, each of the corner connection members 43 facilitates relative rotational or pivotal movements of the respective top rails 25, 30, 20 and 22 relative to the connection members 43, and thus the posts 36 and 38, but precludes any meaningful lateral movement between these members. These corner frame members 43 also permit limited tilting movement between the corner posts 36 and 38 and their respective top rail members.

Each of the corner pocket connection members 47 and each of the side pocket connection members 53 permit limited tilting movement of the vertical post members 21, 24, 28, 36 and 38 relative to the trailer bed 12, but preclude any vertical movement.

The top connection members 63 allow rotational or pivotal movement of the top rails 25 and 30 relative to the member 63, and thus the support post 28, but substantially preclude any lateral movement between the top rails 25,30 and the connection members 63. Limited tilting movement, however, is permitted between the vertical support posts 28 and the connection member 63.

Figure 2:
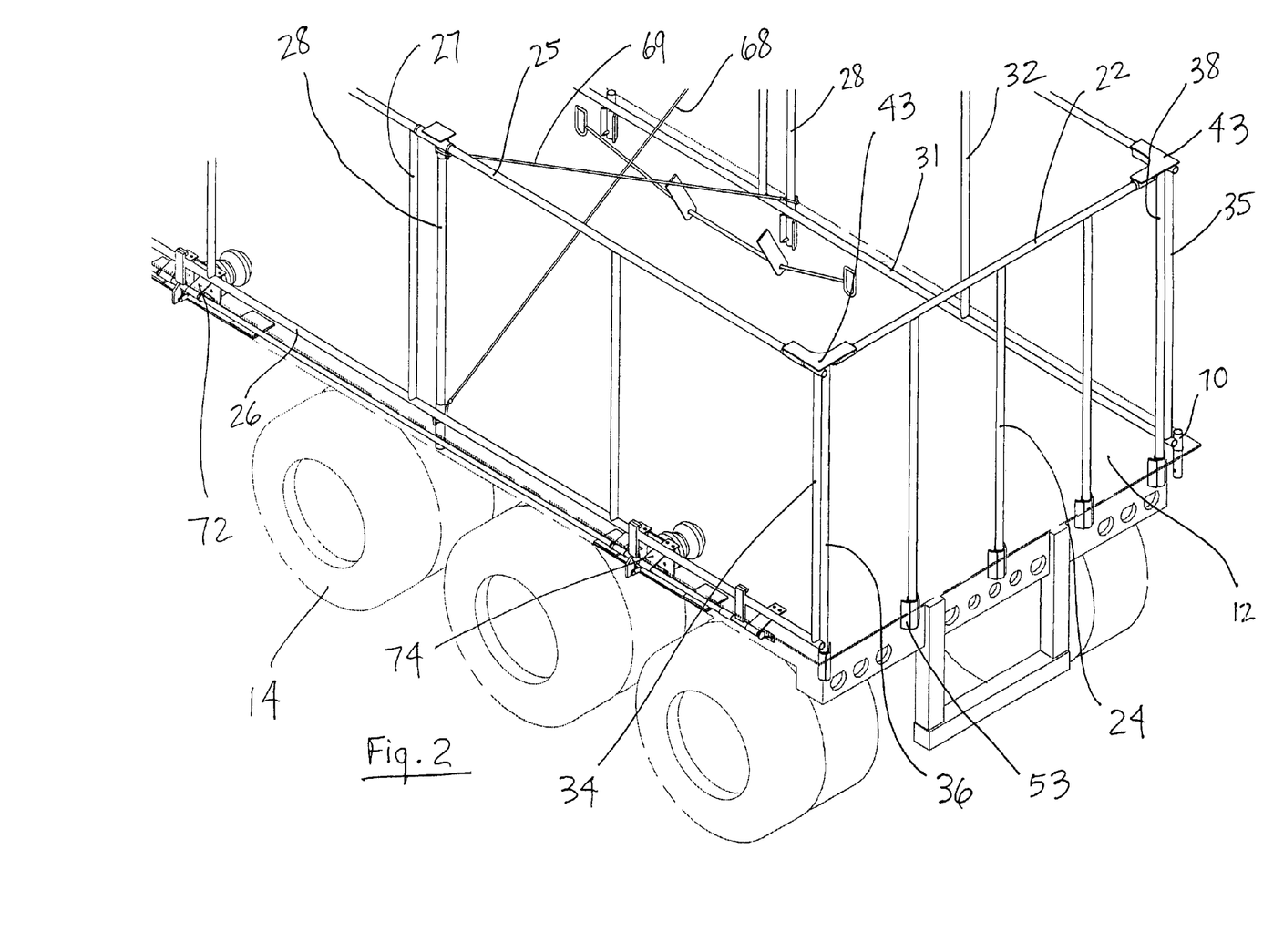
FIG. 2 is a fragmentary, isometric view of the produce trailer and trailer cage as viewed from the upper left and rearward corner of the trailer.

Because the elongated gates defining the side cage portions 18 and 19 are pivotable along their respective top rails 25 and 30, means are provided for retaining such gates in a closed or operative position during use. For the gate on the right-hand side of the trailer comprising the side cage portion 19, this means includes the plurality of vertically extending stop members 70 extending above the bottom rail 32 as shown in FIGS. 2 and 18. These stop members 70 are generally cylindrically shaped pipe sections which extend through openings in the bed extension 13 and which are connected with the main trailer bed frame 12 via a mechanism similar to the connection member 53. Specifically, as shown best in FIG. 17, the lower ends of the stop member 70 are captured by a connection member 71 comprising a pocket defined by a cylindrically shaped pipe section. The pipe section is connected to the trailer bed 12 via a pair of plate members. The vertical position of this stop member 70 relative to the bottom rail 32 and relative to the connection member 71 is maintained via a bolt or other threaded member extending through aligned openings in the connection member 71 and the lower end of the stop member 70. If it is desired for the gate associated with the side cage portion 19 to be opened, the bolts and the stop members 70 can be removed, thereby allowing such gate member to be pivoted outwardly for cleaning of the bed or the like.

The gate on the left-hand side of the trailer defining the side cage portion 18 is designed to be selectively unlocked to permit removal of produce from within the trailer cage and then locked to permit produce to be received and transported. In the preferred embodiment, this latching means is automated and comprises a plurality of latching members positioned along the length of the trailer bed on the left side. Specifically, as shown in FIGS. 1, 2 and 3, double latch members 74 are provided near each of the front and rear ends of the trailer and a plurality of single latch members 72 are laterally spaced between the ends and along the length of the trailer. Details of these latching mechanisms are shown best in FIGS. 16 and 17.

Figure 16:
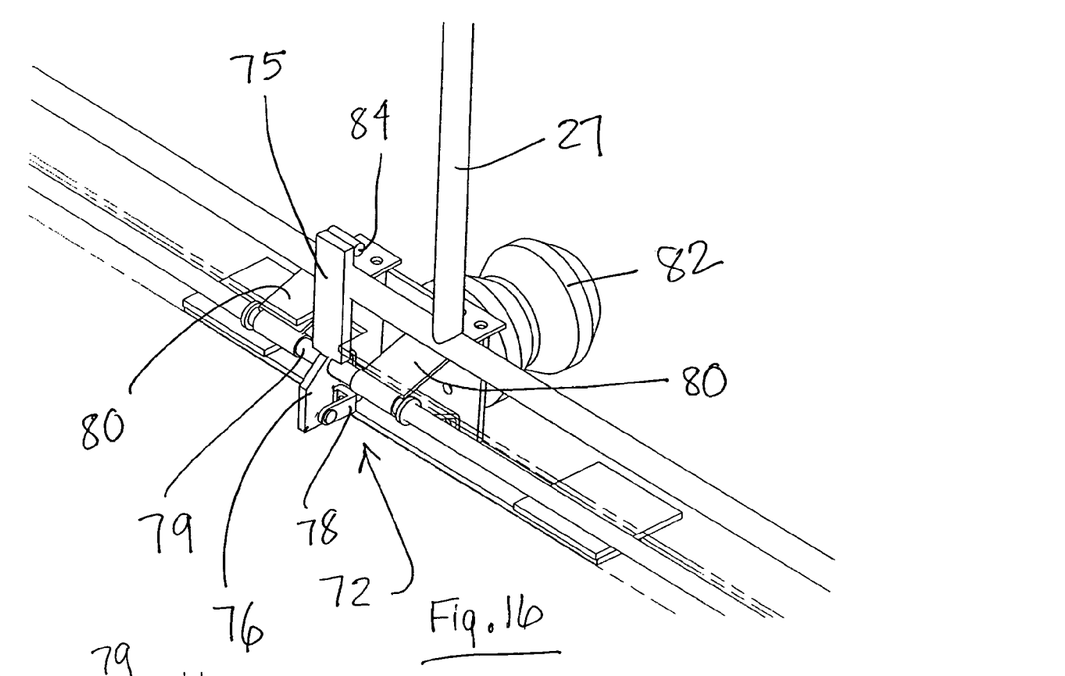
FIG. 16 is fragmentary, isometric view showing a single gate latch member.

Specifically, the single latching means of FIG. 16 includes a gate stop bar 75. When this bar 75 is in a substantially vertical position as shown in FIG. 16, it engages the bottom rail 26 and prevents the gate from swinging outwardly. This stop bar is rigidly connected with a cylinder bracket 76 and a pivot rod 79 via the sleeve 78. The pivot rod 79 extends the length of the gate and is mounted for rotational or pivotal movement relative to a pair of laterally spaced mounting brackets 80,80. A lower end of the cylinder bracket 76 is connected with one end of a piston rod 81. The other end of the piston rod 81 is connected with an air spring or air cylinder 82. Selected actuation of the air spring 82 moves the piston 81 between an extended position in which the cylinder bracket 76 and the stop bar 75 are in a latched position as shown in FIG. 16 and a retracted position in which the cylinder bracket 76 and the stop bar 75 are in an unlatched position as shown in FIGS. 19 and 20. Accordingly, when the piston rod 81 is in its extended position, the stop bar 75 is generally vertically oriented as shown in FIG. 16 to prevent outward pivotal movement of the gate. When the trailer is positioned adjacent to a discharge hopper and it is desired to dump the contents of the trailer, the air springs or cylinders 82 are actuated to move the piston rod 81 to its retracted position. This pivots the stop bar 75 outwardly and releases the bottom rail 26. This permits the gate to swing outwardly as shown in FIGS. 19 and 20. Preferably, a vertical stop member 84 can be welded or otherwise connected to the upper end of each stop bar 75 to prevent the bottom rail 26 from prematurely rising up over the top of the stop bar 75.

Figure 17:
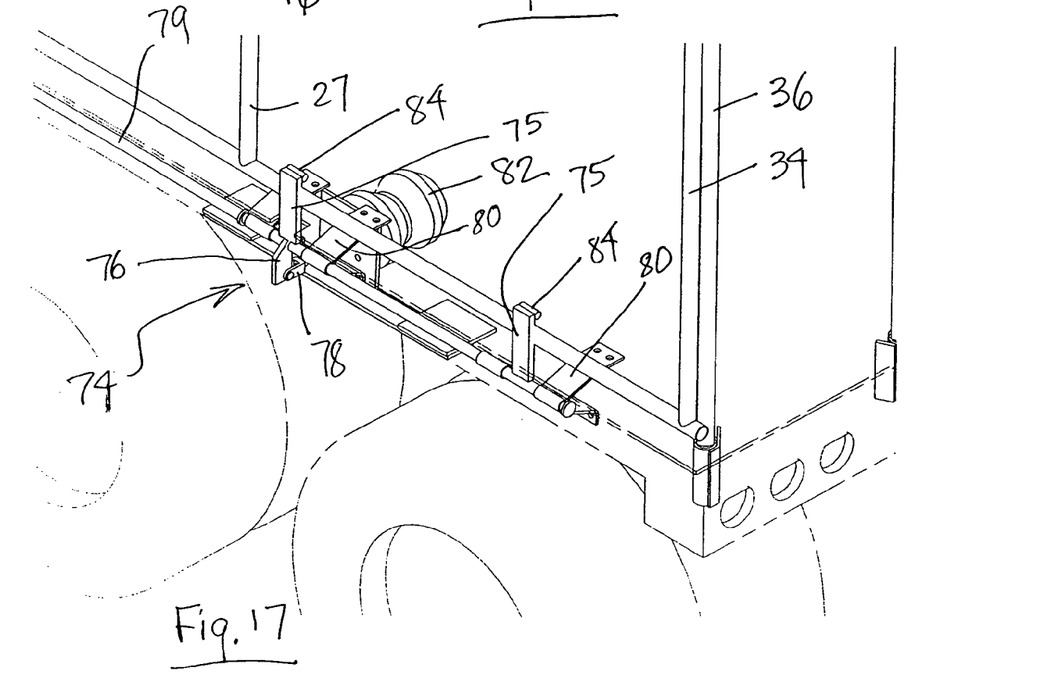
FIG. 17 is a fragmentary, isometric view showing a double gate latch member.

Each of the double gate lock means is illustrated in FIG. 17. This double gate lock is similar to the single gate lock shown in FIG. 16, except that an additional pivot rod support bracket 80 is provided and an additional stop bar 75 is connected to the pivot rod 79.

Each of the gate latching members 72 and 74 is controlled by an air dump system in which the air or pneumatic pressure maintaining the stop gates 75 in their latch position is dumped simultaneously. Accordingly, when the air is dumped from the system, all of the latch mechanisms 72 and 74 pivot outwardly simultaneously. This allows the dumping gate (the gate on the left side of the trailer) to swing outwardly about its top rail 25, thereby allowing the contents to be emptied from the trailer.

Figure 21:
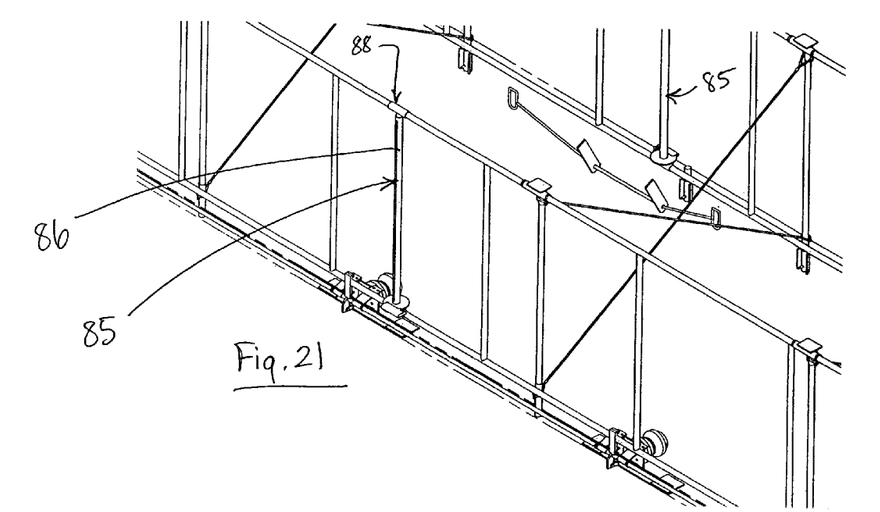
FIG. 21 is a fragmentary isometric view showing portions of the trailer cage and the means for tensioning the mesh on the gates.
Figure 22:
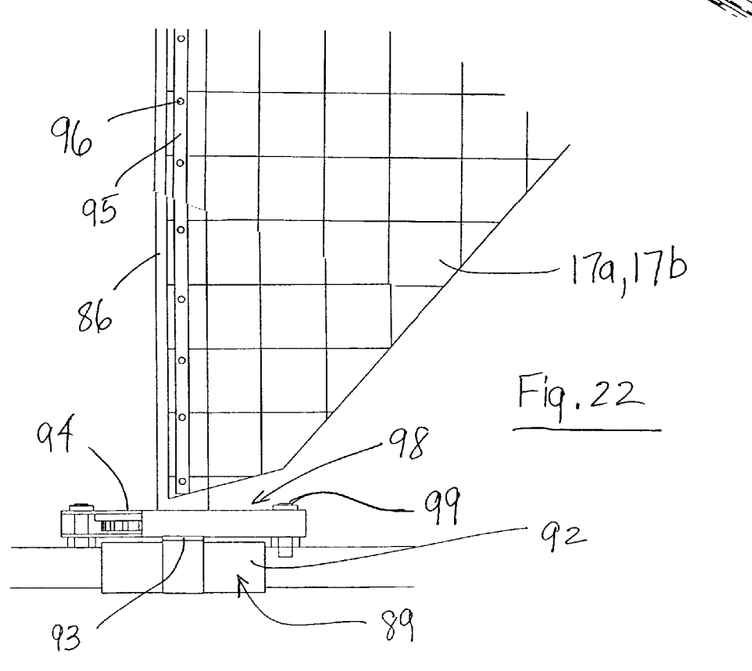
FIG. 22 is a fragmentary enlarged elevational view showing a portion of the means for tensioning the mesh on the trailer gates and the means for rotating the mesh tensioning mechanism.

Reference is next made to FIGS. 21-27 showing various views of the mechanism for tensioning the mesh on each of the gates. As shown in FIG. 21, each of the gates is comprised of the top and bottom rails 25,30, their respective end and intermediate rails 36, 27 and 38, 32 and a mesh 17. In the preferred embodiment, this mesh 17 is a poly grid beet fence with UV protection and a two inch by two inch grid. The mesh 17 is connected around the periphery of each of the side gates to cover the inner surfaces of the gates. The peripheral edges of the mesh 17 are connected with the top and bottom rails and the end rails of each of the gates by plurality of conventional connecting members such as connecting ties. In the preferred embodiment, the mesh 17 for each gate includes a first mesh section 17a connected with one corner post and extending toward the middle and second mesh section 17b connected with the opposite corner post and extending toward the middle.

Positioned approximately mid-way between the end rails of each of the gates is a mesh tensioning mechanism 85 for selectively tensioning the mesh sections 17a and 17b within the gates. This mechanism includes an elongated, vertically extending mesh tensioning bar or tubular member 86 and a pair of end linkages 88 and 89 for connecting the member 86 relative to the top and bottom rails 25,25 and 30,31 of each gate. Specifically, the connection members 88 and 89 connect the member 86 to the top and bottom gate rails so that the member 86 is both rotatable and laterally moveable relative to such rails. As shown best in FIGS. 23 and 24, the connection member 88 includes a hollow sleeve 90 surrounding the top rail of each gate and a downwardly extending stub member 91 extending into the upper end of the tubular member 86. The stub member 91 is rigidly connected with the sleeve 90 via welding or the like. With this structure, the tubular member 86 is permitted to rotate relative to the stub 91 and thus the respective top gate rails 25 and 30. Also, the tubular member 86 and the entire connection member 88 are permitted to laterally move relative to the top rails 25 and 30.

Figures 23, 24, 27:
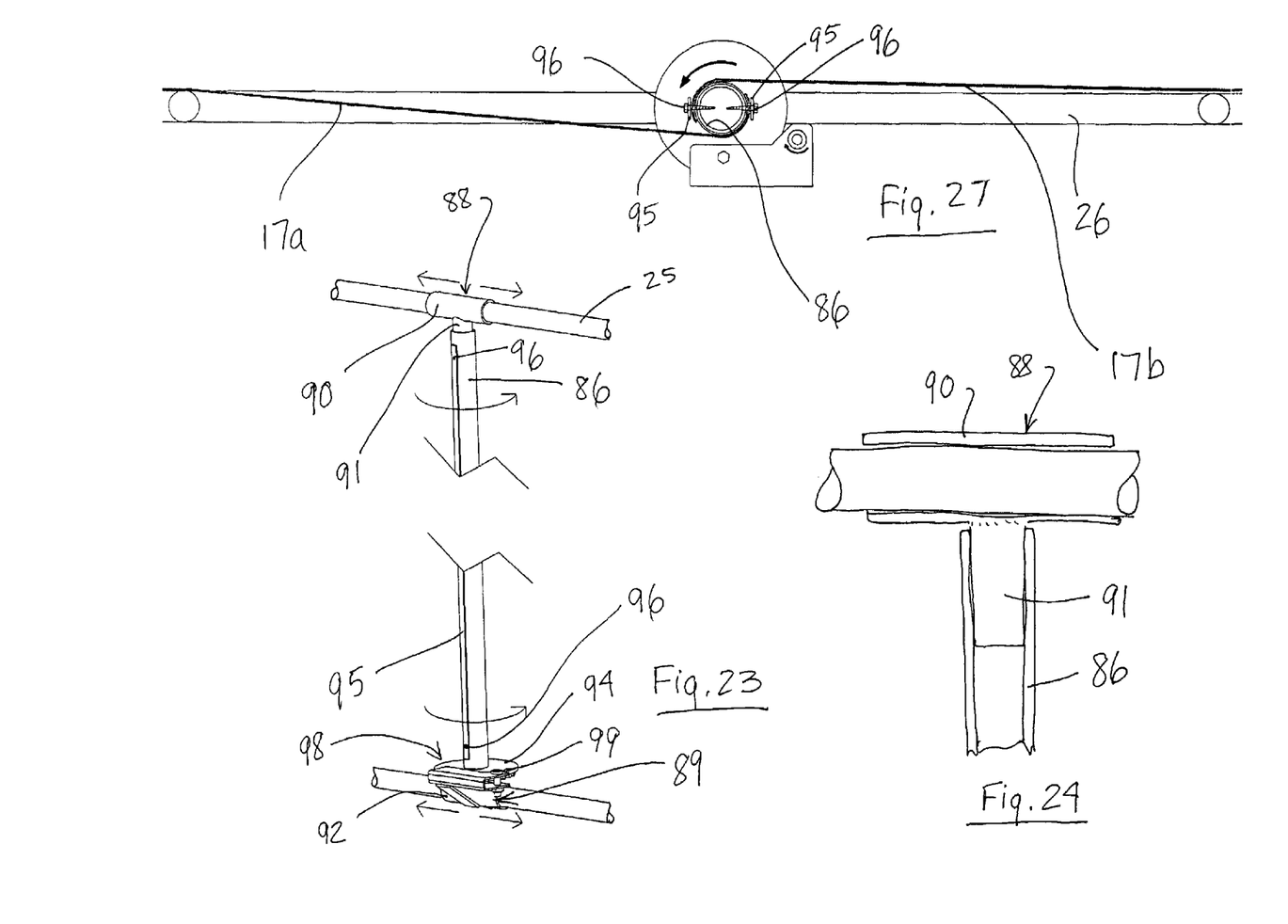
FIG. 23 is a further isometric view showing the mesh tightening means.
FIG. 24 is a view, partially in section, showing the linkage between the mesh tensioning means and the top rail of the gate.
FIG. 27 is a view, partially in section, showing the mesh of a gate being tightened.
Figure 25:
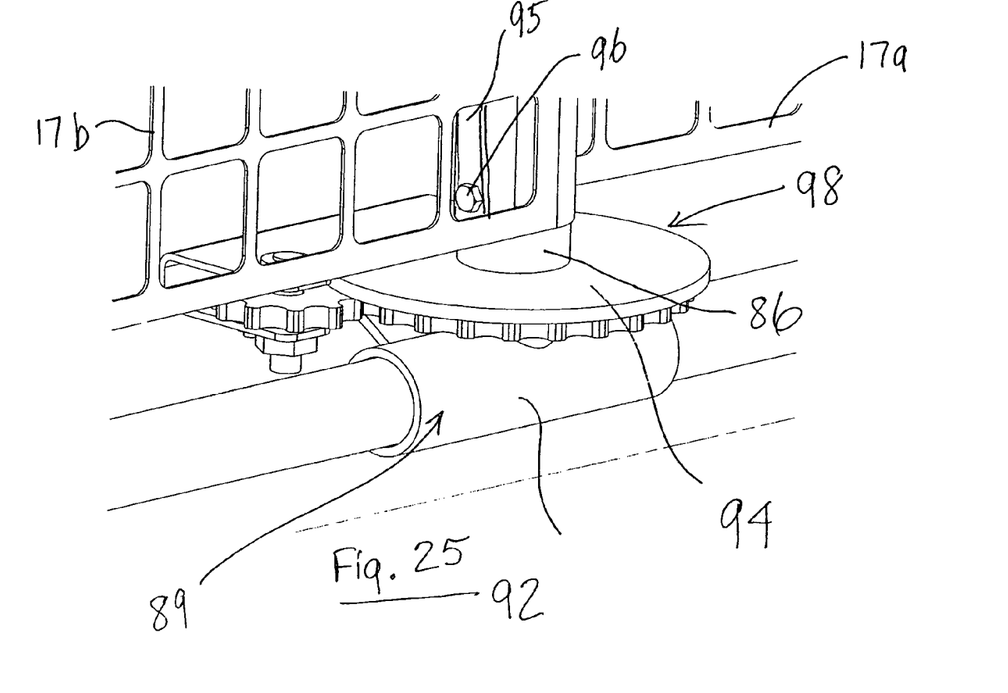
FIG. 25 is an isometric view showing the connection between the mesh tightening means and the bottom rail of the gate.
Figure 26:
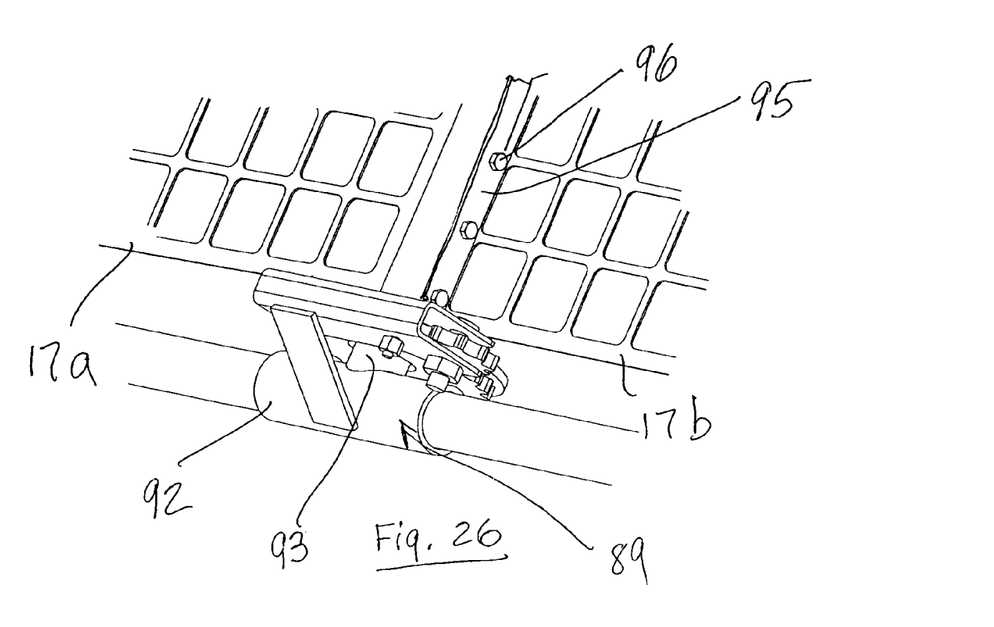
FIG. 26 is a further isometric view showing the connection between the mesh tightening means and the bottom rail of the gate.

Similarly, with reference to FIGS. 23, 25 and 26, the bottom connection member 89 includes a hollow sleeve 92 surrounding each of the respective bottom rails 26 and 31 and a stub pipe section 93 which extend into the hollow member 86. A ratchet member 98 or other means for rotating the member 86 is connected with the member 89. The ratchet member 98 includes a portion 94 which is selectively rotatable via a ratchet mechanism and ratchet handle. This portion 94 is rigidly connected with the lower end of the member 86 via welding or the like. Thus, rotation of the ratchet portion 94 causes corresponding rotation of the member 86. To rotate the mechanism, a ratchet handle or other means can be inserted into or connected with the member 99 to rotate the portion 94. With this structure, rotational movement of the tubular member 86 relative to the bottom rails 26 and 31 is permitted. Also, with this structure, limited lateral movement is also permitted between the tubular member 86 and the bottom rails 26 and 31.

As shown in FIG. 21, the tubular member 86 extends from near the top rail of each of the gates to near the bottom rail. As shown best in FIGS. 21, 22, 23, 25, 26 and 27, a pair of mesh retaining bars 95 are connected on opposite sides of the tubular member 86 via a plurality of screws or bolts 96. These bars 95 are connected with the member 86 and sandwich inner edges of the mesh sections 17*a* and 17*b* therebetween.

As described above, the lower end of the tubular member 86 is connected with the ratchet means 98 and is rotatable with the rotatable ratchet portion 94. In the preferred embodiment, the ratchet means 98 functions to rotate the portion 94, and thus the member 86, in a first direction to tighten or tension the mesh sections 17*a* and 17*b* within the gates. The ratchet mechanism can also be selectively released if it is desired to remove tension from the mesh sections in any one of the gates.

As shown best in FIG. 27, as the member 86 is rotated in a counterclockwise direction, the mesh sections 17*a* and 17*b* on each side of the member 86 will tend to be pulled toward the center of the gate. Because the member 86 is laterally moveable relative to the top and bottom gate rails, the tubular member 86 will seek its own center and provide equal mesh tension on both sides of the member 86.

Thus, the mesh tensioning mechanism for each of the gates includes a tensioning bar or tubular member which is connected to the mesh or mesh sections and which is rotatable and laterally moveable relative to the top and bottom rails of the gates.

Although the description of the preferred embodiment is quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. A produce trailer comprising:
a trailer bed and
a trailer cage connected with said bed and comprising:
a plurality of cage portions including a front cage portion, a rear cage portion and a pair of side cage portions, at least one of said side cage portions comprised of a single gate extending from said front cage portion to said rear cage portion;
wherein said single gate includes a pivotable single top rail and a single bottom rail, and is a unitary, substantially rigid structure having a plurality of vertical intermediate posts spaced along the extent of said single gate, each post extending between the top rail and bottom rail and having an end operably connectable with said trailer bed and an opposite end movable with said single top rail; and
a plurality of latch assemblies mounted to and positioned along the length of said bed, said latch assemblies having a latch member selectively moveable between a latching position in which said latch member is engaged with said bottom rail and an unlatched position in which said latch member is free from engagement with said bottom rail.

2. A produce trailer comprising:
a trailer and bed and
a cage having a front and a rear end and a pair of sides, said cage connected with said bed ad comprising:
a gate extending along at least a portion of one of said sides, said gate including a top rail, a bottom rail and a pair of end rails;
a mesh extending over said gate and connected to said top rail, said bottom rail and said pair of end rails; and
a mesh tensioning member extending between said top and bottom rails and positioned between said pair of end rails, said tensioning member being connected with said mesh and being rotatable and laterally moveable relative to said top and bottom rails.

3. The trailer of claim 2 wherein said gate is of unitary construction.

4. The trailer of claim 2 wherein said gate extends substantially the entire length of one of said pair of sides.

5. The trailer of claim 2 including a ratchet to rotate said tensioning member.

6. The trailer of claim 2 including a first mesh section extending from one of said end rails to said tensioning member and a second mesh section extending from the other of said end rails to said tensioning member.

7. The trailer of claim 6 including a ratchet to rotate said tensioning member.

* * * * *

UNITED STATES PATENT AND TRADEMARK OFFICE
CERTIFICATE OF CORRECTION

PATENT NO.        : 7,530,627 B2
APPLICATION NO.   : 11/216471
DATED             : May 12, 2009
INVENTOR(S)       : Daniel Eugene Brennan It is certified that error appears in the above-identified patent and that said Letters Patent is hereby corrected as shown below:

|  | PTO | Should Read |
|---|---|---|
| On the Title page, after item [73]: | "Tramsport" | -- Transport -- |

Signed and Sealed this

Twenty-eighth Day of July, 2009

JOHN DOLL
*Acting Director of the United States Patent and Trademark Office*